(12) United States Patent
Tuma

(10) Patent No.: US 7,198,743 B2
(45) Date of Patent: Apr. 3, 2007

(54) METHOD FOR PRODUCING AN ADHESIVE CLOSING ELEMENT

(75) Inventor: Jan Tuma, Berlin (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 493 days.

(21) Appl. No.: 10/343,154

(22) PCT Filed: Jul. 31, 2001

(86) PCT No.: PCT/EP01/08834

§ 371 (c)(1),
(2), (4) Date: Jan. 29, 2003

(87) PCT Pub. No.: WO02/13647

PCT Pub. Date: Feb. 21, 2002

(65) Prior Publication Data

US 2004/0020591 A1    Feb. 5, 2004

(30) Foreign Application Priority Data

Aug. 16, 2000  (DE) ............................. 100 39 937

(51) Int. Cl.
*B29C 47/00* (2006.01)
(52) U.S. Cl. ................ 264/167; 264/173.1; 264/210.1; 264/334
(58) Field of Classification Search ................ 264/167, 264/210.2, 173.1, 210.1, 334; 425/363, 471
See application file for complete search history.

(56) References Cited

U.S. PATENT DOCUMENTS 4,894,060 A * 1/1990 Nestegard ................... 604/391
5,116,563 A * 5/1992 Thomas et al. ............. 264/167
5,312,456 A * 5/1994 Reed et al. ................. 411/456
6,127,018 A    10/2000 Akeno et al.

(Continued)

FOREIGN PATENT DOCUMENTS

JP    10248866    * 3/1997

(Continued)

OTHER PUBLICATIONS

Translation of WO 00/25620 by Jan Tuma, "Method for producing an adhesive closing element"(May 2006).*

(Continued)

*Primary Examiner*—Christina Johnson
*Assistant Examiner*—Matthew J. Daniels
(74) *Attorney, Agent, or Firm*—Roylance, Abrams, Berdo & Goodman, L.L.P.

(57) ABSTRACT

A process for produces an adhesive closing element including a plurality of hook elements connected to a backing (10) forming a single piece with the hook elements and being disposed symmetrically thereon. The hook elements are provided in the form of a stem component (17) having a head piece (16). A deformable material is introduced into a forming zone in between a production master (3) and a forming tool (5). The opposite-lying defining walls, at least when seen in a longitudinal section of the respective forming cavity (12), are provided with a continuous convex trajectory. A continuous transition between the cross-sectional forms of the stem component (17) and the head piece (16) is provided for a hooking of the backing (10) resulting in seamless removal.

15 Claims, 4 Drawing Sheets

U.S. PATENT DOCUMENTS 6,287,665 B1 * 9/2001 Hammer ..................... 428/100
6,669,884 B1 * 12/2003 Tuma ......................... 264/167

FOREIGN PATENT DOCUMENTS

| WO | 9820767 | | 5/1998 |
| WO | WO 00/25620 | * | 5/2000 |
| WO | 0050208 | | 8/2000 |

OTHER PUBLICATIONS

Translation of WO 98/20767 by Pavel Hammer, "Method and device for producing a hook-and-pile type closure part from thermoplastic plastics" (May 2006).*

* cited by examiner

METHOD FOR PRODUCING AN ADHESIVE CLOSING ELEMENT

FIELD OF THE INVENTION

The present invention relates to a process for producing an adhesive closing part with a plurality of interlocking means having a symmetrical structure and connected integrally to a backing. The interlocking means are in the form of a stem part provided with a head part. A moldable material is supplied to the shaping zone between a pressure tool and a molding tool driven such that the backing is formed in the shaping zone and conveyed in the transport direction. Mold cavities with boundary walls opposite one another are used as the shaping element on the molding tool.

BACKGROUND OF THE INVENTION

WO 00/00053 A1 discloses a generic process for producing an adhesive closing part with a plurality of interlocking means formed integrally with a backing. The interlocking means are in the form of stems which have end-side thickened areas. A moldable plastic material in the plastic or liquid state is supplied to the gap between a pressure roller and a mold roller driven such that the backing is formed in the gap of the shaping zone and is conveyed in the transport direction. The shaping element on the molding tool is a screen which has continuous cavities. The interlocking means are formed by the moldable material at least partially setting in the cavities of the screen.

Inside of a first shaping screen is a second shaping element formed as an inner, second screen. The size of the cross section of the openings of the inner second screen is chosen to be somewhat greater than the cross sectional size of the cavities of the first screen. When the plastic is added, end-side thickened areas of the stem are formed. The stem cross sections which are produced in doing so are generally rotationally symmetrical. The stems themselves form cylindrical elements which run with their base part into the backing material and are provided on their free end with a head part formed by the second screen with its shaping cavities. As a result of the different cross sectional sizes between the mold cavities of the first screen for the stem parts and the mold cavities of the second screen for the head parts, there are edge-like transitions between the indicated parts and associated high adhesive forces of at least the head part within the mold cavities of the second screen. When the backing with the interlocking means is removed from the mold, these high adhesive forces can lead at least in part even to tearing off of the molded head part when the process sequence is not adjusted precisely. Since head parts which are produced with this described process are also made essentially cylindrical and/or provided with corner end segments, the head parts, in the same way as the stem parts, are made relative rigid and less pliable. This forming leads to difficulties if, for example, the head parts of the same type are to fit into the respective intermediate spaces of the interlocking means of another closing part, which spaces have been left open, to produce a complete closure. These intermediate spaces are not cleared first of all as desired for the interlocking due to the rigidity of the interlocking means.

The interlocking means produced using this process have, as already shown, rotationally-symmetrical stem cross sections, the stems themselves first forming cylindrical elements. If these stems are then subjected to a calendering process, in which a calender roller presses on the closure material against the action of a counterstay roller, the free stem ends are widened in cross section on their head side. This arrangement supports the desired head shaping for the respective interlocking means. The stems themselves assume concave paths in cross section, as is disclosed in WO 99/60880 A1. Only the concave path in this connection is produced by a separate calender production process and not by means of the screen production process according to WO 00/00053 A1 with the known mold removal problems.

SUMMARY OF THE INVENTION

Objects of the present invention are to provide an improved process such that good ejection of the interlocking means, after the shaping process, is achieved, even at very high production rates, and such that the interlocking means produced in this way leads to closing parts which adhere well and which can be joined to one another.

These objects are attained by the present invention, where at least in the lengthwise section of the respective mold cavity, the opposing boundary walls are provided with a continuously convex path. A continuously extending transition is achieved between the cross sectional shapes of the stem part and the head part for the interlocking means of the backing. This continuous transition along the convex path then leads essentially to unimpeded mold removal process without the danger of the head parts tearing off from their assigned stem part over sharp-edged shape transitions. Moreover, head parts can be formed with a height which decreases toward their outer peripheral edge such that a type of interlocking lip is formed. In this manner, the head parts are elastically very flexible on the edge side and are easy interlocked to one another or with an assigned loop material. With the pertinent fitting of interlocking means of one type into the intermediate spaces of the interlocking means of another or same type, the lips of the head parts are pushed elastically aside, to immediately re-assume their original position after engaging and to block the initially cleared intermediate space again. In this way, very favorable closing behavior between the two adhesive closing parts which form a closure is possible.

In one preferred embodiment of the process of the present invention, the curvature of the respective path, in the direction of the head part which is to be molded, is made more pronounced than in the direction of the base part via which the stem part is connected to the backing. This curvature has proven especially favorable both for removal from the mold and also for producing the desired geometries of the interlocking means. Preferably, it is provided here that, viewed from the lengthwise direction of the stem part in the direction of the head part, the respective path with its more pronounced curvature begins above the middle, preferably in the upper third.

In one especially preferred embodiment of the process of the present invention, some of the lengthwise sections with their convex path run into the corners of the boundary walls such that the cross section of the stem part and/or of the head part is formed as a polygon, especially a hexagon. Although as a result of the convex paths it would be possible to make the interlocking means rotationally symmetrical, it has proven advantageous to provide a hexagon or other polygonal shape for them. As a result of this edge configuration, especially in the area of the head part, major deviations occur on the outer peripheral area. This configuration makes it easier for the interlocking means, also in the form of a coating of another closing part which forms a closure with the initially mentioned closing part, to accomplish effective interlocking. The indicated hexagonal or polygonal shape makes it possible to clearly increase especially the peeling strength of the closure.

In another preferred embodiment of the process of the present invention, the respective mold cavity is made as part of a mold screen or mold grating of the molding tool. In this way, it is possible to produce the entire structure of the interlocking means with only one type of screen or grating.

But in a process of a different nature, it can also be provided that each part of the interlocking means, preferably both the head part and also the stem part, has its own mold screen or mold grating with different cross sections. In this way, a plurality of configuration possibilities can be achieved in the production of the interlocking means.

Since the mold cavities to be produced have a complex structure, in continuation of the process of the present invention, it has proven especially advantageous to produce them with their paths by a galvanic coating process or by a laser.

In another preferred embodiment of the process of the present invention, the mold screen or the mold grating is made as a jacket part placed around the shaping tool in the form of a roll body and joined to it. Thus, if necessary, the mold screen or the mold grating can be easily replaced as a closing part, and the roller-like shaping tool is inherently preserved for the continuing production process.

With the process of the present invention, interlocking means can be produced which have a geometrically very small structure. The implementation of micro-adhesive closures is easily possible. Furthermore, the density of the interlocking means per $cm^2$ of backing material can be very dramatically increased. As a result, the adhesive force between the adhesive closing parts of a closure can be increased. It is especially advantageous to make the mold cavities and the interlocking means as rotationally symmetrical parts, especially in the form of hyperboloids.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
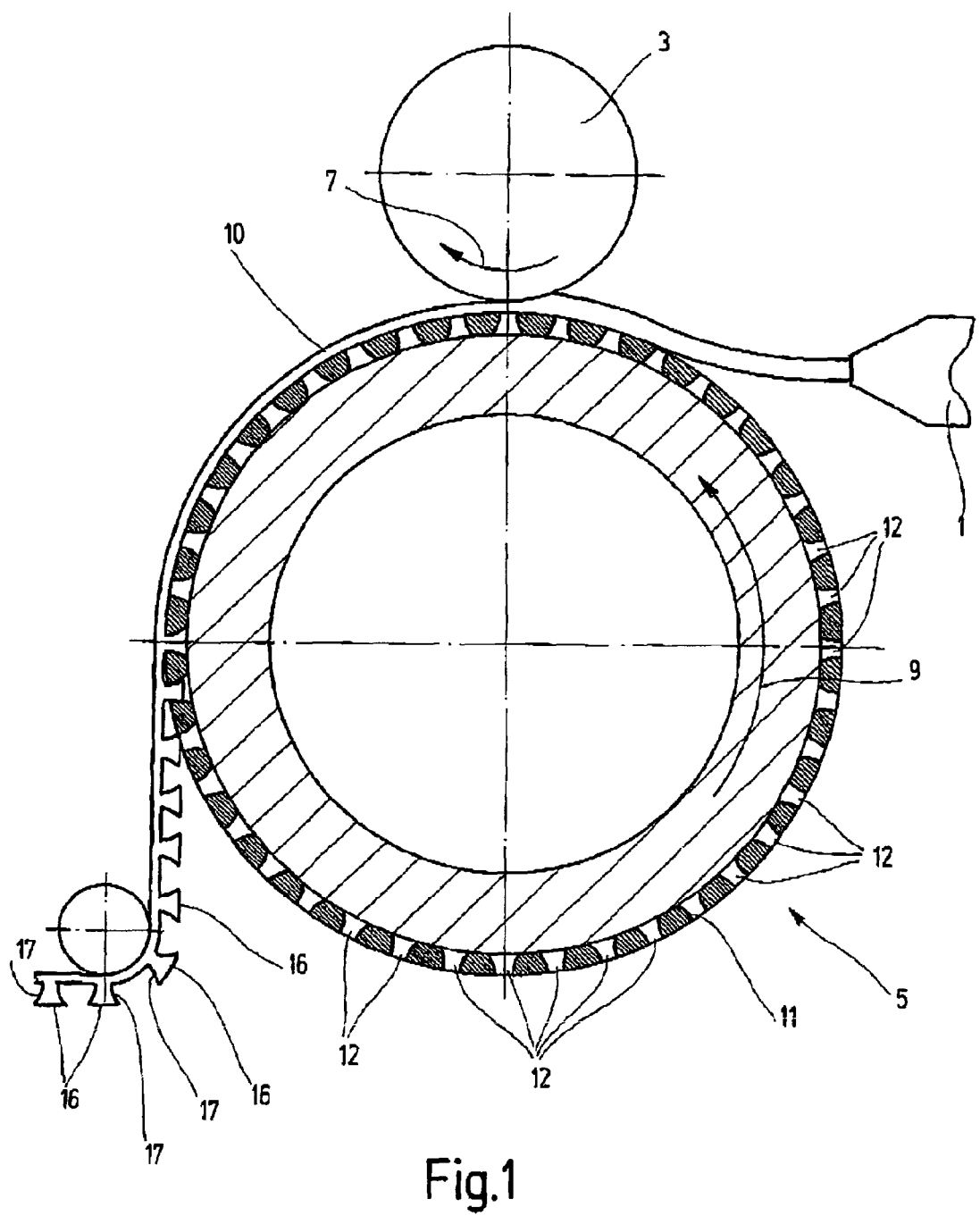
FIG. 1 is a side elevational view in section of a device for implementing a process according to an embodiment of the present invention, a view which is highly schematically simplified and not to scale.

FIG. 1 schematically shows parts of a device for implementing a process according to an embodiment of the present invention. An extruder head 1 operates as the feed means for a plastic in a plastic or liquid state, especially a thermoplastic. The plastic is supplied to the gap between the pressure tool and a molding tool as a strip with a width corresponding to that of the adhesive closing part which is to be produced. The pressure tool is a pressure roller 3. The molding tool is a mold roller, designated as 5 in its entirety. The two rollers are driven in the directions of rotation shown in FIG. 1 by curved arrows 7 and 9. Between the rollers, a conveyor gap is formed through which the plastic strip is conveyed in the transport direction. At the same time in the gap forming the shaping zone, the plastic strip is molded into the backing 10 of the adhesive closing part. The backing 10 acquires the shape necessary for forming the interlocking means on the side adjacent to the mold roller 5 by the shaping elements of the mold roller 5.

Figure 2:
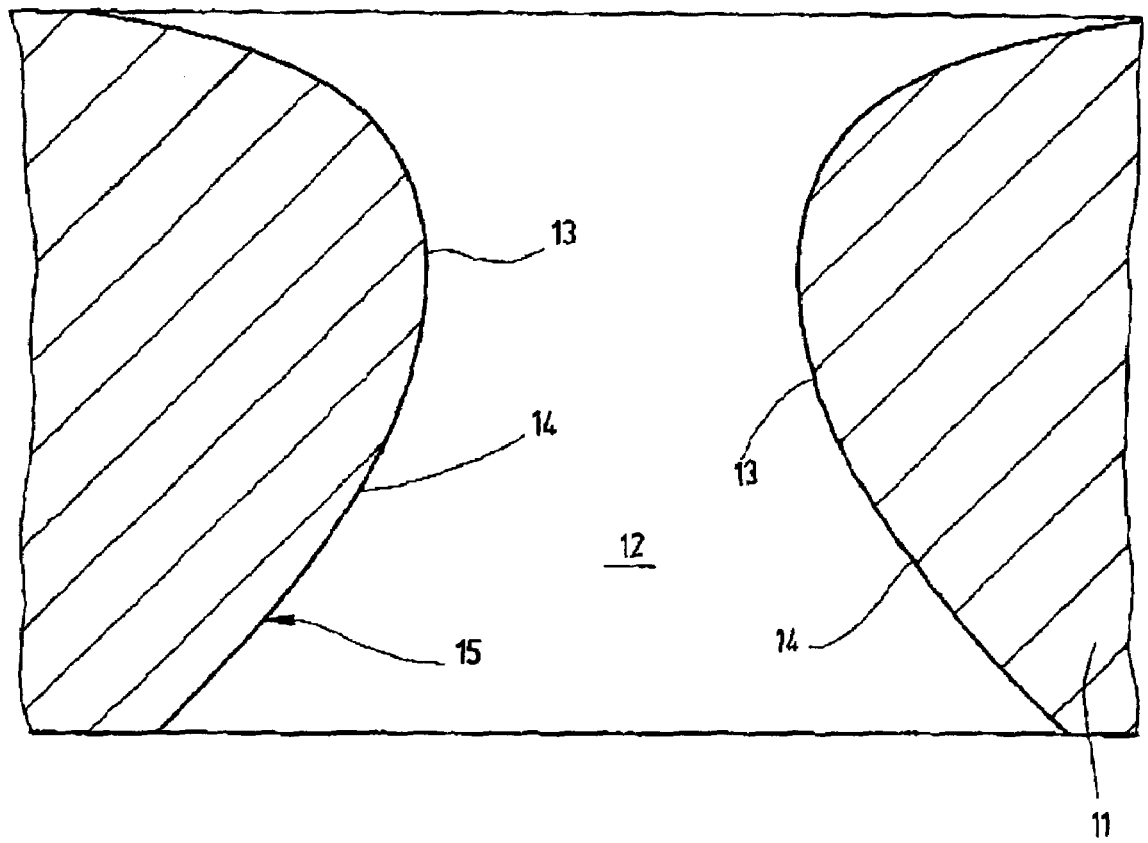
FIG. 2 is a partial side elevational view in section through one mold cavity of the device of FIG. 1, greatly enlarged.

For this purpose, the mold roller 5, on its periphery, has a screen 11 with individual mold cavities 12. One such mold cavity 12 is shown enlarged, by way of example, in FIG. 2. The mold cavities 12, as is not detailed, are regularly distributed over the mold roller 5 with its screen 11 on the outer peripheral side. The distribution and number can be freely selected. FIG. 2 shows a lengthwise section of the mold cavity 12 be used (i.e., at the top in FIG. 1). The boundary walls 13 are opposite one another in the lengthwise section, and are continuously provided with a convex path 14. The two indicated boundary walls 13, with respect to the rotationally-symmetrical structure of the mold cavity 12, are fundamentally part of the terminating shaping wall 15 bordered by the screen material 11 of the mold roller 5. With these mold cavities 12, it is possible to produce interlocking means in the form of a stem part 17 with a head part 16.

As FIG. 2 shows, the curvature of the respective path 14 in the direction of the head part 16 to be molded as being more pronounced than in the direction of the base part 18 connecting the stem part 17 to the backing 10. It has been found to be especially advantageous if, viewed from the lengthwise direction of the stem part 17 in the direction of the head part 16, the path 14 has its more pronounced curvature beginning above the middle, preferably in the upper third.

To obtain the indicated cavities 12 with their rotationally symmetrical structure in the form of a hyperboloid, galvanic coating processes have proven effective. A cylindrical cavity (not shown) is coated with a coating material until the convex path 14 results. Optionally, the convex path 14 can also be produced by way of a laser process from a solid screen or grating material.

Figure 3:
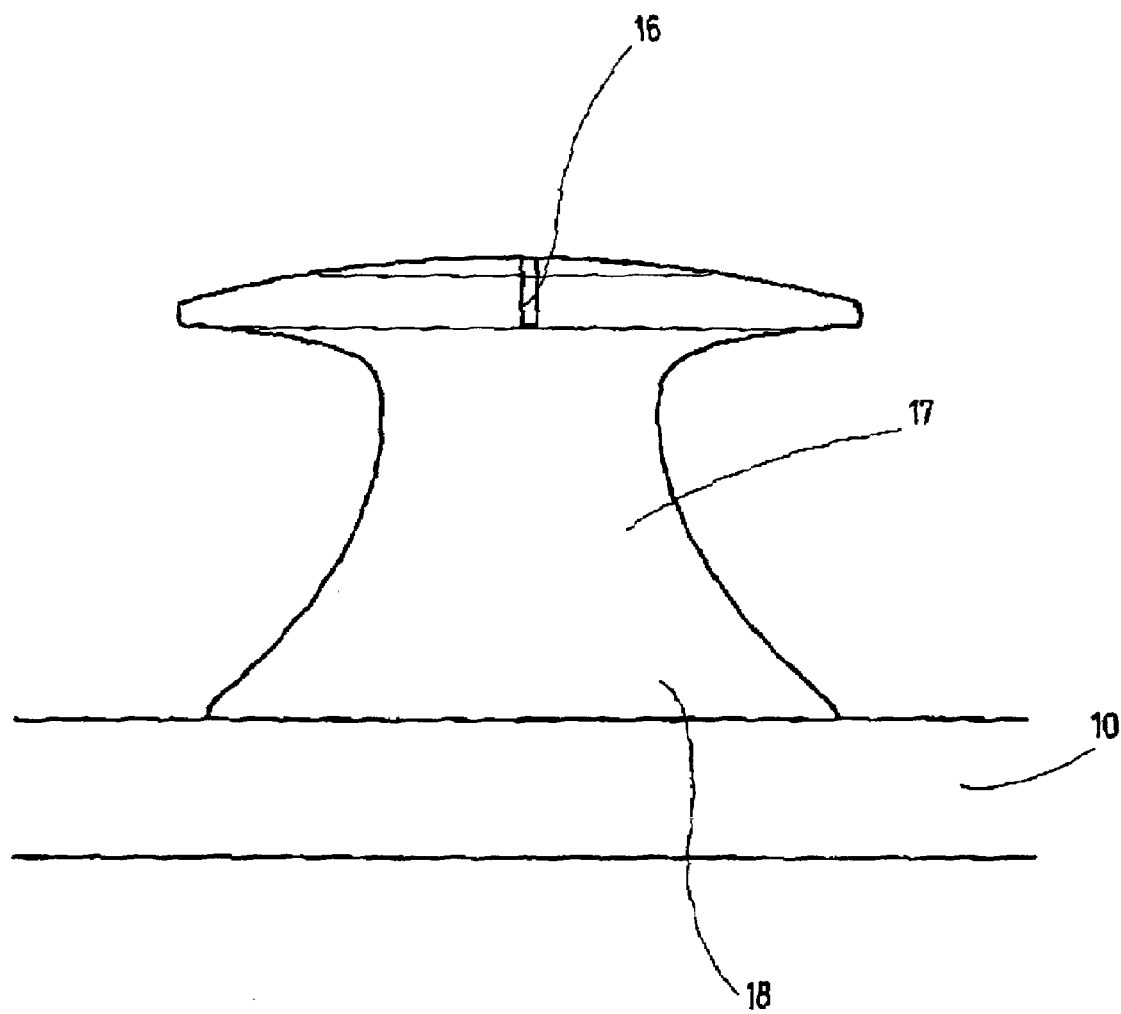
FIG. 3 is a side elevational view of an interlocking means produced using the mold cavity shown in FIG. 2.
Figure 4:
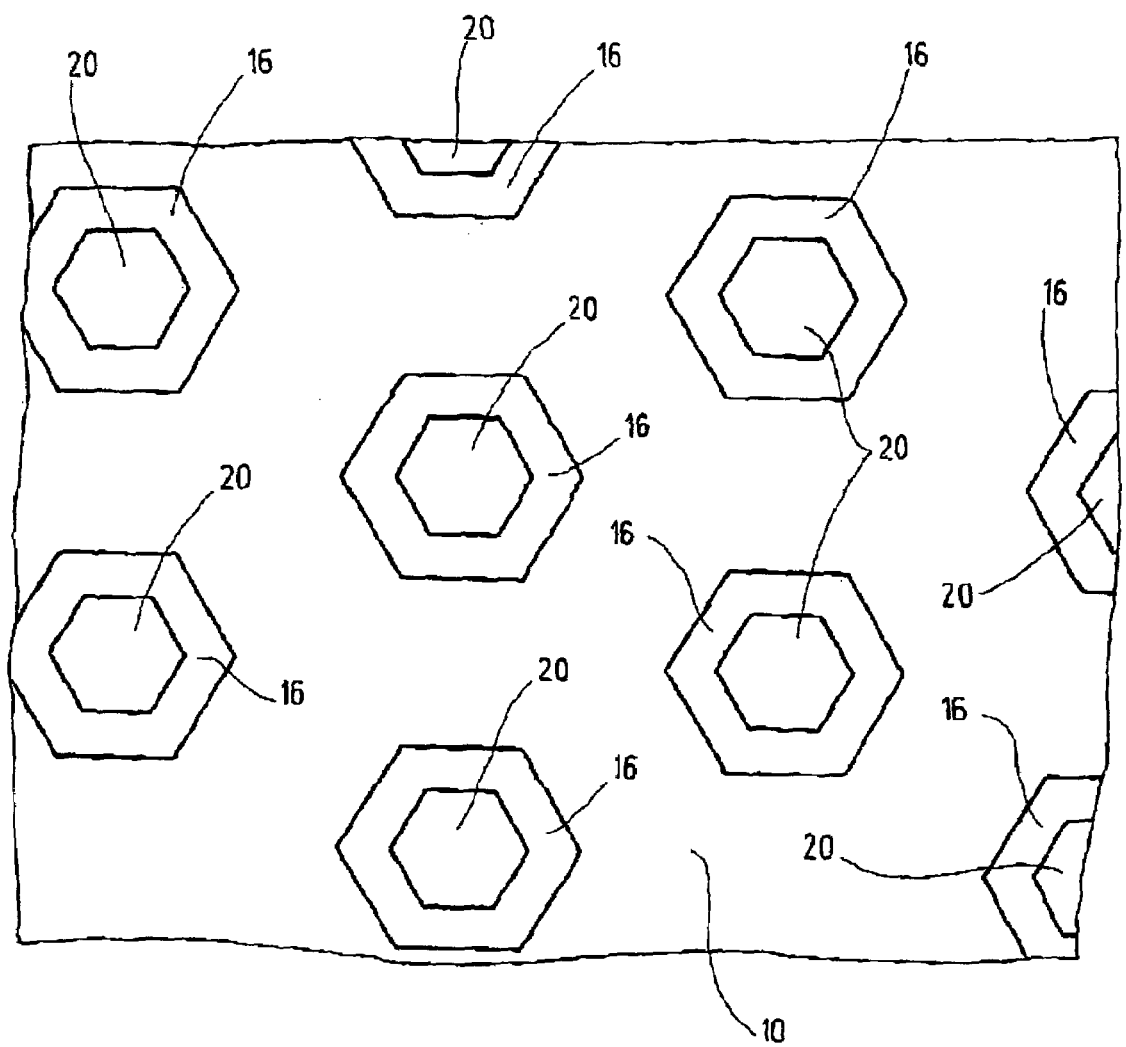
FIG. 4 is a top plan view of a backing strip material produced with the device of FIG. 1, with several interlocking means as shown in FIG. 3.

The interlocking means shown in FIG. 3 can be obtained with the above described process. The symmetrical structure is formed directly by production in a mold cavity 12 as shown in FIG. 2. The interlocking means can have a geometrically very small structure, for example, can have a height of only 0.4 mm, with a width of the closure head of roughly 0.6 mm. In this embodiment, the cross section of the stem part 17 is roughly 0.25 mm. As shown in FIG. 4, a plurality of these interlocking means can be located on the backing 10. The head shape of the head part 16 need not be further reworked. However, in certain processes, the heads of the interlocking means can be subjected to a calender process or the like, and in doing so can be calendered. Cuts can be made in the outside contour of the closed, annular head part 16 to obtain a plurality of interlockings along the head part 16. The interlocking means shown in FIGS. 3 and 4 can also have a different appearance, especially regarding their head part 16. For example, they can be provided with head geometries as shown in PCT/WO 00/00053. If there is a risk that the edge-side free ends of the head parts 16, which are hexagonal in cross section in this case, should be unintentionally turned up when being ejected from the screen roller 11, the head parts 16 can be re-calendered from the top by a calender roller. They then assume the shape as shown in FIG. 3, except that the middle area 20 of the respective head part 16, which area which is arched upward convexly, would then arch inward concavely (not shown) in the direction of the stem part 17. The middle areas 20, shown in FIG. 4 from the top and encompassed by the hexagonal edge shape of the head part 16, would therefore arch into the plane of the drawings when viewed in the direction of FIG. 4, and in this way, would form a depression, in contrast to FIG. 3.

Biologically decomposable materials are also possible as the moldable materials for implementing the process of the present invention. Such materials can also be produced based on renewable or petrochemical raw materials, or combinations of the two.

While one embodiment has been chosen to illustrate the invention, it will be understood by those skilled in the art that various changes and modifications can be made therein without departing from the scope of the invention as defined in the appended claims.

What is claimed is:

1. A process for producing an adhesive closing part with laterally symmetrical interlocking structures integrally connected to a backing, each interlocking structure having a stem part, a head part at one end of the stem part, and a base part at an opposite end of the stem part connecting the stem part to the backing, the process comprising the steps of:
   supplying moldable material to a shaping zone between a pressure tool and a molding tool;
   driving the pressure tool and the molding tool to form the backing in the shaping zone and conveying the backing in a transport direction; and
   molding the moldable material in mold cavities in the molding tool, each of the mold cavities having boundary walls opposite one another extending in a lengthwise direction of the mold cavity continuously along a convex path, each convex path having a curvature in a form of a hyperboloid with a more pronounced portion defined by decreased radii of curvature and by narrowing of spaces between the boundary walls, each more pronounced portion being closer to a head molding part of the cavity than to a base molding part of the cavity, each cavity being rotationally symmetrical to form rotationally symmetrical interlocking structures.

2. A process according to claim 1 wherein in each cavity, in the lengthwise direction thereof, the more pronounced portion of the curvature begins above a middle point of the cavity.

3. A process according to claim 1 wherein the more pronounced portion is in an upper third portion of the cavity.

4. A process according to claim 1 wherein lengthwise sections of the convex paths extend into corners of the boundary walls to form at least one of the stem parts and the head parts as polygons.

5. A process according to claim 4 wherein the polygons are hexagons.

6. A process according to claim 1 wherein the mold cavities are formed as a part of a mold screen on the molding tool.

7. A process according to claim 1 wherein the head parts and the stem parts are formed in cavities in first and second screens, respectively on the molding tool, the cavities in the first and second screens having different cross-sections.

8. A process according to claim 6 wherein the mold screen is a jacket part placed about and joined to a roll body to form the molding tool.

9. A process according to claim 1 wherein the mold cavities are formed by a galvanic coating process.

10. A process according to claim 1 wherein the mold cavities are formed by a laser.

11. A process according to claim 1 wherein the mold cavities form interlocking structures having heights and width between 0.05 mm and 1 cm and having a density of 500 interlocking structures per $cm^2$ of the backing.

12. A process according to claim 1 wherein the mold cavities have curvatures which are continuous along entire lengths of the mold cavities.

13. A process according to claim 1 wherein the convex paths are devoid of straight line portions.

14. A process according to claim 1 wherein opposed boundary walls are mirror images of one another.

15. A process according to claim 1 wherein the convex paths are devoid of straight line portions in stem molding parts of the molding cavities.

* * * * *